(12) United States Patent
Natarajan et al.

(10) Patent No.: US 10,592,843 B2
(45) Date of Patent: Mar. 17, 2020

(54) UNMANNED AERIAL DELIVERY TO SECURE LOCATION

(71) Applicant: Walmart Apollo, LLC, Bentonville, AR (US)

(72) Inventors: Chandrashekar Natarajan, San Ramon, CA (US); Donald R. High, Noel, MO (US); John J. O'Brien, V, Farmington, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 221 days.

(21) Appl. No.: 15/360,091

(22) Filed: Nov. 23, 2016

(65) Prior Publication Data

US 2017/0147975 A1 May 25, 2017

Related U.S. Application Data

(60) Provisional application No. 62/260,086, filed on Nov. 25, 2015.

(51) Int. Cl.
*G06Q 10/08* (2012.01)
*B64C 39/02* (2006.01)
(Continued)

(52) U.S. Cl.
CPC ....... *G06Q 10/0832* (2013.01); *B64C 39/024* (2013.01); *B64F 1/00* (2013.01);
(Continued)

(58) Field of Classification Search
CPC ............ G06Q 10/0832; G06Q 10/0833; B64C 39/024; B64C 2201/128; H04L 63/0876;
(Continued)

(56) References Cited

U.S. PATENT DOCUMENTS

| 1,314,878 A | 9/1919 | Lewinson |
| 5,212,649 A * | 5/1993 | Pelletier .................. G06Q 10/08 221/120 |

(Continued)

FOREIGN PATENT DOCUMENTS

| CA | 2944814 A1 | 10/2015 |
| WO | 2015160672 | 10/2015 |

OTHER PUBLICATIONS

Jamie Redman, "Chronicled Demos Blockchain-Connected Delivery Drone", published by Bitcoin.com, on Oct. 18, 2016, all pages (Year: 2016).*

(Continued)

*Primary Examiner* — Kevin H Flynn
*Assistant Examiner* — Omar Zeroual
(74) *Attorney, Agent, or Firm* — Schmeiser, Olsen & Watts LLP; Timothy P. Collins

(57) ABSTRACT

A delivery management system comprises a communication device that receives a notification of a communication established between an unmanned aerial vehicle (UAV) that delivers a payload and a delivery box constructed and arranged to receive the payload from the UAV when the UAV is a predetermined distance from the delivery box and moving in a direction toward the delivery box, the communication including an identity of the UAV; a verification device that processes the notification and validates the identity of the UAV; and an instruction generator that generates an instruction to the delivery box to open the delivery box in response to the verification device validating the identity of the UAV and a determination by the communication device that the communication is established between the UAV and the delivery box. The communication device includes an autolocker communication device that outputs the instruction to the delivery box.

19 Claims, 4 Drawing Sheets

US 10,592,843 B2

Page 2

(51) Int. Cl.
*G07C 9/00* (2006.01)
*H04L 29/06* (2006.01)
*B64F 1/00* (2006.01)

(52) U.S. Cl.
CPC ..... *G06Q 10/0833* (2013.01); *G07C 9/00182* (2013.01); *H04L 63/0876* (2013.01); *B64C 2201/128* (2013.01); *G07C 2009/0092* (2013.01); *G07C 2009/00769* (2013.01)

(58) Field of Classification Search
CPC ...... G07C 9/00182; G07C 2009/00769; G07C 2009/0092
See application file for complete search history.

(56) References Cited

U.S. PATENT DOCUMENTS

| | | | | |
|---|---|---|---|---|
| 5,385,265 | A * | 1/1995 | Schlamp | G07F 7/00 221/131 |
| 6,215,397 | B1 | 4/2001 | Lindskog | |
| 6,690,997 | B2 * | 2/2004 | Rivalto | G06Q 10/08 700/237 |
| 7,086,198 | B2 * | 8/2006 | Hayden | G07F 11/54 221/119 |
| 7,857,161 | B2 * | 12/2010 | Pinney | G06F 19/3462 221/10 |
| 7,925,375 | B2 * | 4/2011 | Schininger | G07F 11/007 221/131 |
| 8,145,351 | B2 * | 3/2012 | Schininger | E05G 1/06 221/12 |
| 9,135,403 | B1 * | 9/2015 | Tolmosoff | G06F 19/3462 |
| 9,211,025 | B1 | 12/2015 | Elhawwashy | |
| 9,244,147 | B1 * | 1/2016 | Soundararajan | G01S 1/44 |
| 9,387,928 | B1 * | 7/2016 | Gentry | B64C 39/024 |
| 9,436,923 | B1 * | 9/2016 | Sriram | H04L 63/126 |
| 9,513,627 | B1 * | 12/2016 | Elazary | G05B 19/41865 |
| 9,545,995 | B1 * | 1/2017 | Chau | B64C 39/024 |
| 9,550,577 | B1 * | 1/2017 | Beckman | B64C 39/024 |
| 9,573,684 | B2 | 2/2017 | Kimchi et al. | |
| 9,635,000 | B1 * | 4/2017 | Muftic | H04L 63/0435 |
| 9,741,255 | B1 * | 8/2017 | Navot | G08G 5/0082 |
| 9,743,272 | B1 * | 8/2017 | Ogrinz | H04W 8/22 |
| 9,783,297 | B2 * | 10/2017 | Patrick | B64C 39/024 |
| 9,842,120 | B1 * | 12/2017 | Siris | H04W 4/029 |
| 9,875,592 | B1 * | 1/2018 | Erickson | G07C 9/00309 |
| 10,022,614 | B1 * | 7/2018 | Tran | A63B 71/145 |
| 10,026,054 | B1 | 7/2018 | Staton et al. | |
| 10,028,606 | B1 | 7/2018 | Ritchie | |
| 10,039,113 | B2 * | 7/2018 | Ogrinz | H04W 76/10 |
| 10,068,228 | B1 * | 9/2018 | Winklevoss | G06Q 20/3829 |
| 10,103,936 | B2 * | 10/2018 | Kurian | H04L 41/0803 |
| 10,158,480 | B1 * | 12/2018 | Winklevoss | H04L 9/3239 |
| 10,243,964 | B2 * | 3/2019 | Kraemer | H04L 63/105 |
| 10,333,706 | B2 * | 6/2019 | Smith | H04L 9/0861 |
| 10,351,261 | B1 | 7/2019 | Bryant | |
| 2001/0034665 | A1 * | 10/2001 | Kinory | G06Q 10/08 705/26.1 |
| 2002/0035515 | A1 * | 3/2002 | Moreno | A47G 29/141 340/5.73 |
| 2006/0145837 | A1 * | 7/2006 | Horton | G06Q 10/08 340/539.13 |
| 2008/0078707 | A1 * | 4/2008 | Wattawa | B07C 7/00 209/630 |
| 2011/0238300 | A1 * | 9/2011 | Schenken | B60W 40/09 701/408 |
| 2012/0143482 | A1 * | 6/2012 | Goossen | G08G 5/0034 701/120 |
| 2012/0246039 | A1 * | 9/2012 | Fain | G06Q 10/08 705/32 |
| 2012/0253548 | A1 * | 10/2012 | Davidson | G06Q 10/08 701/1 |
| 2012/0254058 | A1 * | 10/2012 | Walker | G06Q 10/08 705/333 |
| 2013/0103606 | A1 * | 4/2013 | Holliday | G06Q 50/28 705/333 |
| 2013/0240673 | A1 * | 9/2013 | Schlosser | G05D 1/101 244/137.1 |
| 2014/0014008 | A1 * | 1/2014 | Tompkins | E05G 1/02 109/23 |
| 2014/0032034 | A1 * | 1/2014 | Raptopoulos | G08G 5/0069 701/25 |
| 2014/0254896 | A1 * | 9/2014 | Zhou | B25J 9/0006 382/124 |
| 2015/0006005 | A1 * | 1/2015 | Yu | G06Q 10/08 701/22 |
| 2015/0106294 | A1 * | 4/2015 | Robinson | G06F 21/62 705/339 |
| 2015/0120094 | A1 * | 4/2015 | Kimchi | B64C 39/024 701/3 |
| 2015/0142692 | A1 | 5/2015 | Gillen et al. | |
| 2015/0158599 | A1 * | 6/2015 | Sisko | B64F 1/32 244/114 R |
| 2015/0175276 | A1 * | 6/2015 | Koster | B64F 1/32 244/114 R |
| 2015/0183528 | A1 * | 7/2015 | Walsh | B64F 1/32 701/3 |
| 2015/0277440 | A1 * | 10/2015 | Kimchi | G01S 17/08 701/26 |
| 2015/0294262 | A1 * | 10/2015 | Nelson | G06Q 10/083 705/330 |
| 2015/0323930 | A1 * | 11/2015 | Downey | G07C 5/004 701/2 |
| 2015/0332206 | A1 * | 11/2015 | Trew | G06Q 10/0836 705/330 |
| 2015/0332283 | A1 * | 11/2015 | Witchey | G06F 21/645 705/3 |
| 2016/0033966 | A1 * | 2/2016 | Farris | A47G 29/122 701/15 |
| 2016/0098730 | A1 * | 4/2016 | Feeney | G06Q 30/0185 705/71 |
| 2016/0117934 | A1 † | 4/2016 | Soundararajan et al. | |
| 2016/0180719 | A1 * | 6/2016 | Wouhaybi | G08G 5/0082 701/4 |
| 2016/0185466 | A1 * | 6/2016 | Dreano, Jr. | G06Q 30/0635 705/26.81 |
| 2016/0195602 | A1 * | 7/2016 | Meadow | G01S 5/0294 701/517 |
| 2016/0196755 | A1 * | 7/2016 | Navot | G05D 1/0676 701/4 |
| 2016/0235236 | A1 * | 8/2016 | Byers | A47G 29/14 |
| 2016/0253907 | A1 * | 9/2016 | Taveira | G08G 5/006 701/3 |
| 2016/0257401 | A1 * | 9/2016 | Buchmueller | B64C 39/024 |
| 2016/0267558 | A1 * | 9/2016 | Bonnell | G06Q 30/0283 |
| 2016/0300187 | A1 * | 10/2016 | Kashi | G06Q 10/0836 |
| 2016/0307449 | A1 * | 10/2016 | Gordon | G08G 5/0069 |
| 2016/0316322 | A1 * | 10/2016 | Gillen | G06Q 10/0833 |
| 2016/0358432 | A1 * | 12/2016 | Branscomb | G08B 13/1965 |
| 2016/0359986 | A1 * | 12/2016 | Jones | G06F 16/29 |
| 2016/0376031 | A1 * | 12/2016 | Michalski | B64C 39/024 701/15 |
| 2017/0011333 | A1 * | 1/2017 | Greiner | G06Q 10/083 |
| 2017/0015415 | A1 * | 1/2017 | Chan | B64C 39/024 |
| 2017/0045894 | A1 * | 2/2017 | Canoy | G05D 1/0676 |
| 2017/0083860 | A1 * | 3/2017 | Sriram | H04L 63/126 |
| 2017/0083862 | A1 * | 3/2017 | Loubriel | G06Q 10/0835 |
| 2017/0090484 | A1 * | 3/2017 | Obaidi | B64C 39/024 |
| 2017/0110017 | A1 | 4/2017 | Kimchi et al. | |
| 2017/0115976 | A1 * | 4/2017 | Mills | G06Q 10/06 |
| 2017/0132393 | A1 * | 5/2017 | Natarajan | G06Q 10/087 |
| 2017/0147808 | A1 * | 5/2017 | Kravitz | G06F 21/45 |
| 2017/0147975 | A1 | 5/2017 | Natarajan et al. | |
| 2017/0148328 | A1 * | 5/2017 | Chan | G08G 5/006 |
| 2017/0149795 | A1 * | 5/2017 | Day, II | H04L 63/101 |
| 2017/0255896 | A1 * | 9/2017 | Van Dyke | G06Q 10/083 |
| 2017/0300905 | A1 * | 10/2017 | Withrow | G06Q 20/401 |
| 2017/0310747 | A1 * | 10/2017 | Cohn | H04L 67/1068 |
| 2017/0328391 | A1 * | 11/2017 | Matsuda | B64C 29/02 |
| 2017/0349376 | A1 * | 12/2017 | Porat | B60L 58/12 |
| 2017/0372391 | A1 * | 12/2017 | Metnick | G06Q 30/0613 |

(56) References Cited

U.S. PATENT DOCUMENTS

| | | | |
|---|---|---|---|
| 2018/0053161 A1* | 2/2018 | Bordash | G06Q 20/102 |
| 2018/0109767 A1* | 4/2018 | Li | H04N 5/23206 |
| 2018/0117447 A1* | 5/2018 | Tran | A63B 71/145 |
| 2018/0130159 A1* | 5/2018 | High | G05D 1/0088 |
| 2018/0137306 A1* | 5/2018 | Brady | H04L 9/0643 |
| 2018/0137461 A1* | 5/2018 | Wilkinson | G06Q 20/18 |
| 2018/0137465 A1* | 5/2018 | Batra | G06Q 10/103 |
| 2018/0141453 A1* | 5/2018 | High | G05D 1/0684 |
| 2018/0155011 A1 | 6/2018 | Greiner et al. | |
| 2018/0239343 A1* | 8/2018 | Voorhies | G05D 1/0234 |
| 2018/0252533 A1* | 9/2018 | Jantunen | G01C 21/206 |
| 2018/0253092 A1* | 9/2018 | Trapero Esteban | G05D 1/0022 |
| 2018/0265194 A1* | 9/2018 | Gauglitz | G06Q 50/10 |
| 2018/0268386 A1* | 9/2018 | Wack | G06Q 20/102 |
| 2018/0268719 A1* | 9/2018 | Guan | G08G 5/0034 |
| 2018/0270611 A1* | 9/2018 | Jones | H04W 4/021 |
| 2018/0275654 A1* | 9/2018 | Merz | G01S 13/9303 |
| 2018/0300679 A1* | 10/2018 | Mahmood | H04W 12/00512 |
| 2019/0066047 A1 | 2/2019 | O'Brien et al. | |

OTHER PUBLICATIONS

Hy Chantz, "Using Blockchain to Address Drone Cybersecurity", published by securityIntelligence.com, on Aug. 25, 2016 (Year: 2016).*

Lavars, Nick "Drone delivery nets could be the mailboxes of the future," GizMag.com, Nov. 17, 2014; 30 pages.

"DRU—Domino's Robotic Unit," Dominos.co.nz, first accessed Jul. 28, 2016; 5 pages.

Ó Cionnaith, Fiachra, "CIT student James hopes blood delivery drones take off," IrishExaminer.com, Jun. 10, 2014; 12 pages.

"The Whole Done Package System Concept," Cstwiki.wtb.tue.nl, last modified Oct. 21, 2014, first accessed Sep. 11, 2015; 5 pages.

Gye, Hugo, "Now that's a special delivery: Domino's builds DRONE to deliver pizzas by air and beat traffic," DailyMail.co.uk, Jun. 5, 2013; 7 pages.

Phillips, Alan, "Your Drone Mailbox is Coming," DroneLife.com, May 28, 2014; 3 pages.

Chu, Jennifer, "Delivery by Drone," Lids.MIT.edu/news-and-events, Aug. 21, 2014; 3 pages.

International Preliminary Report on Patentability in PCT/US16/63520 dated Jun. 7, 2018; 8 pages.

International Search Report & Written Opinion in counterpart International Patent Application No. PCT/US16/63520, dated Feb. 9, 2017; 8 pages.

International Search Report & Written Opinion in International Patent Application No. PCT/US17/52906, dated Dec. 12, 2017; 11 pages.

"Amazon Shows off New Delivery Drones at Re: Mars 2019," Interesting Engineering, https://interestingengineering.com/video/amazon-shows-off-new-delivery-drones-at-re-mars, Jun. 6, 2019.

"Amazon Debuts New Package Delivery Drone," TODAY.com, https://www.today.com/video/amazon-debuts-new-package-delivery-drone-61414981780, Jun. 6, 2019, download date of Jun. 5, 2019.

Gaus, Annie, "Amazon Debuts Prime Air Delivery Drone," TheStreet, https://www.thestreet.com/video/amazon-debuts-prime-air-delivery-drone-14982975, Jun. 6, 2019.

Mcintosh, Andrew, "Boeing CEO Says Matternet Investment Makes Drone Deliveries a 'Near-Term Reality'," bizjournals.com, https://www.bizjournals.com/seattle/news/2018/06/27/boeing-ceo-matternet-drone-delivery-investment.html, Jun. 27, 2018.

"Dutch Companies Test Drone Delivery to Smart Mailbox," Ecommerce News, https://ecommercenews.eu/dutch-companies-test-drone-delivery-smart-mailbox/, Aug. 29, 2016.

Lee, Isabella, "Drone Delivery Systems and FlytBase Partner to Develop Smart Mailbox and Precision Landing Kit for Drone Deliveries," UAV Coach, https://uavcoach.com/flytbase-drone-delivery-systems/, Nov. 28, 2018.

"Valqari Drone Delivery Solutions," Valqari, www.valqari.com, Jun. 5, 2019.

Estrin, Sam, "Swiss Postal Service Drone Delivery Testing Update," Drone Universities, https://www.droneuniversities.com/drones/swiss-postal-service-drone-delivery-testing-update/, Jul. 15, 2015.

"Valqari Launches Smart Drone Delivery Mailbox," UAS VISION, https://www.uasvision.com/2019/04/08/valqari-launches-smart-drone-delivery-mailbox/, Apr. 2019.

Sutton, Mark, "Eniverse Launches Drone Delivery Box," ITP.net, http://www.itp.net/616561-eniverse-launches-drone-delivery-box, Feb. 15, 2018.

"AirBox Home," Drone Delivery Systems, https://airboxtechnologies.com, Jun. 5, 2019.

"DJI Drones: Delivering the Future," DJI, https://www.dji.com/altitude/drones-for-good-flytrex-drone-delivery-dji-m600, Jun. 14, 2019.

Saiidi, Uptin, "Airbus Drone Set to Deliver Parcels Throughout a University Campus," https://www.cnbc.com/2018/02/12/airbus-drone-set-to-deliver-parcels-throughout-a-university-campus.html, Feb. 12, 2018, CNBC.

Restriction/Election Requirement in related U.S. Appl. No. 15/712,510, dated Mar. 14, 2019; 6 pages.

International Preliminary Report on Patentability in PCT/US2017/052906 dated Apr. 18, 2019; 10 pages.

Non-Final Office Action in U.S. Appl. No. 15/712,510 dated Aug. 30, 2019; 12 pages.

\* cited by examiner
† cited by third party

UNMANNED AERIAL DELIVERY TO SECURE LOCATION

RELATED APPLICATIONS

This application claims priority to U.S. Provisional Patent Application No. 62/260,086 entitled "Unmanned Aerial Delivery to Secure Location" filed Nov. 25, 2015, the entirety of which is incorporated by reference herein.

FIELD

The present concepts relate generally to the delivery of goods to a predetermined location, and more specifically, to systems and methods for transporting goods by an unmanned aerial vehicle to a last mile location constructed to receive the goods in a controlled manner from the unmanned aerial vehicle.

BACKGROUND

Modern commerce entails the use of trucks, vans, or other ground vehicles to deliver goods to a consumer's home or business, referred to as the "last mile" of a supply chain.

BRIEF SUMMARY

In one aspect, provided is a delivery management system, comprising: a communication device that receives a notification of a communication established between an unmanned aerial vehicle (UAV) that delivers a payload and a delivery box constructed and arranged to receive the payload from the UAV when the UAV is a predetermined distance from the delivery box and moving in a direction toward the delivery box, the communication including an identity of the UAV; a verification device that processes the notification and validates the identity of the UAV; and an instruction generator that generates an instruction to the delivery box to open the delivery box in response to the verification device validating the identity of the UAV and a determination by the communication device that the communication is established between the UAV and the delivery box. The communication device includes an autolocker communication device that outputs the instruction to the delivery box.

In some embodiments, the instruction generator generates an instruction to the delivery box to unlock the delivery box.

In some embodiments, the instruction generator generates the instruction to open the box or unlock the box to a robotics mechanism at the delivery box that physically opens or locks the delivery box.

In some embodiments, the communication device determines when the UAV is moving in a direction away from the delivery box and is a predetermined distance from the delivery box after delivery of the payload, and the autolocker communication device outputs an instruction to the delivery box to close the delivery box.

In some embodiments, the determination is made when the UAV flies outside a geofence about the delivery box, and the UAV cannot communicate with the delivery box.

In some embodiments, at least one of the UAV and the delivery box comprises at least one of a tag for transmitting a beacon signal or a reader for reading a beacon signal.

In some embodiments, the delivery management system further comprises an order generation unit that generates a delivery order for the payload and determines a flight path for the UAV to the delivery box.

In some embodiments, the delivery management system further comprises a notification generator that generates and outputs information regarding the delivery order to an electronic device.

In some embodiments, the delivery management system further comprises the verification device executes an authorization process to confirm access to the delivery box.

In some embodiments, the delivery management system further comprises a blockchain processing device that tracks, registers, and authenticates items of the payload moving through a supply chain.

In some embodiments, validation of the UAV is accomplished through a distribution and sharing of public and/or private keys from the locker system and the UAV, and wherein authentication is verified by comparing acceptable keys from a peer-peer ledger system with keys used by the UAV and locker system.

In one aspect, provided is a store item delivery system, comprising: an unmanned aerial vehicles (UAV) that delivers a payload to a destination; a delivery box constructed and arranged to receive the payload; a geofence system that determines when the UAV is a predetermined distance from the delivery box; and a delivery management system that controls access to the delivery box in response to a determination of the UAV relative to the geofence system.

In some embodiments, the delivery management system generates an instruction to the delivery box to unlock the delivery box.

In some embodiments, the delivery management system generates the instruction to open the delivery box or unlock the delivery box to a robotics mechanism at the delivery box that physically opens or locks the delivery box.

In some embodiments, the delivery management system determines when the UAV is moving in a direction away from the delivery box and is a predetermined distance from the delivery box after delivery of the payload, and outputs an instruction to the delivery box to close the delivery box.

In some embodiments, the UAV is tracked by GPS communications that is transmitted from the UAV to the delivery management system.

In some embodiments, location data of the GPS communications is transmitted to an electronic device, which displays the location data.

In some embodiments, at least one of the UAV and the delivery box comprises at least one of a tag for transmitting a beacon signal or a reader for reading a beacon signal, and wherein the GPS communications complement the beacon signal for determining a location of the UAV and validating for security of opening and closing of the delivery box.

In some embodiments, the store item delivery system further comprising sensors to determine when a product has been received by a locker's payload; and sensors to determine when the payload is clear of obstructions so the locker system can close its' payload.

In some embodiments, the delivery management system also includes a blockchain authentication system.

In one aspect, provided is a method for delivery, comprising: establishing a communication between an unmanned aerial vehicle (UAV) that delivers a payload and a delivery box constructed and arranged to receive the payload from the UAV when the UAV is a predetermined distance from the delivery box and moving in a direction toward the delivery box; and generating an instruction to the delivery box to open the delivery box in response to a validation of the identity of the UAV and a determination that the communication is established between the UAV and the delivery box.

BRIEF DESCRIPTION OF THE SEVERAL VIEWS OF THE DRAWINGS

The above and further advantages may be better understood by referring to the following description in conjunction with the accompanying drawings, in which like numerals indicate like structural elements and features in various figures. The drawings are not necessarily to scale, emphasis instead being placed upon illustrating the principles of the concepts.

DETAILED DESCRIPTION

Systems and methods in accordance with embodiments herein leverage the agility and precision of drones or related aerial technology to improve last mile and delivery performances.

Figure 1:
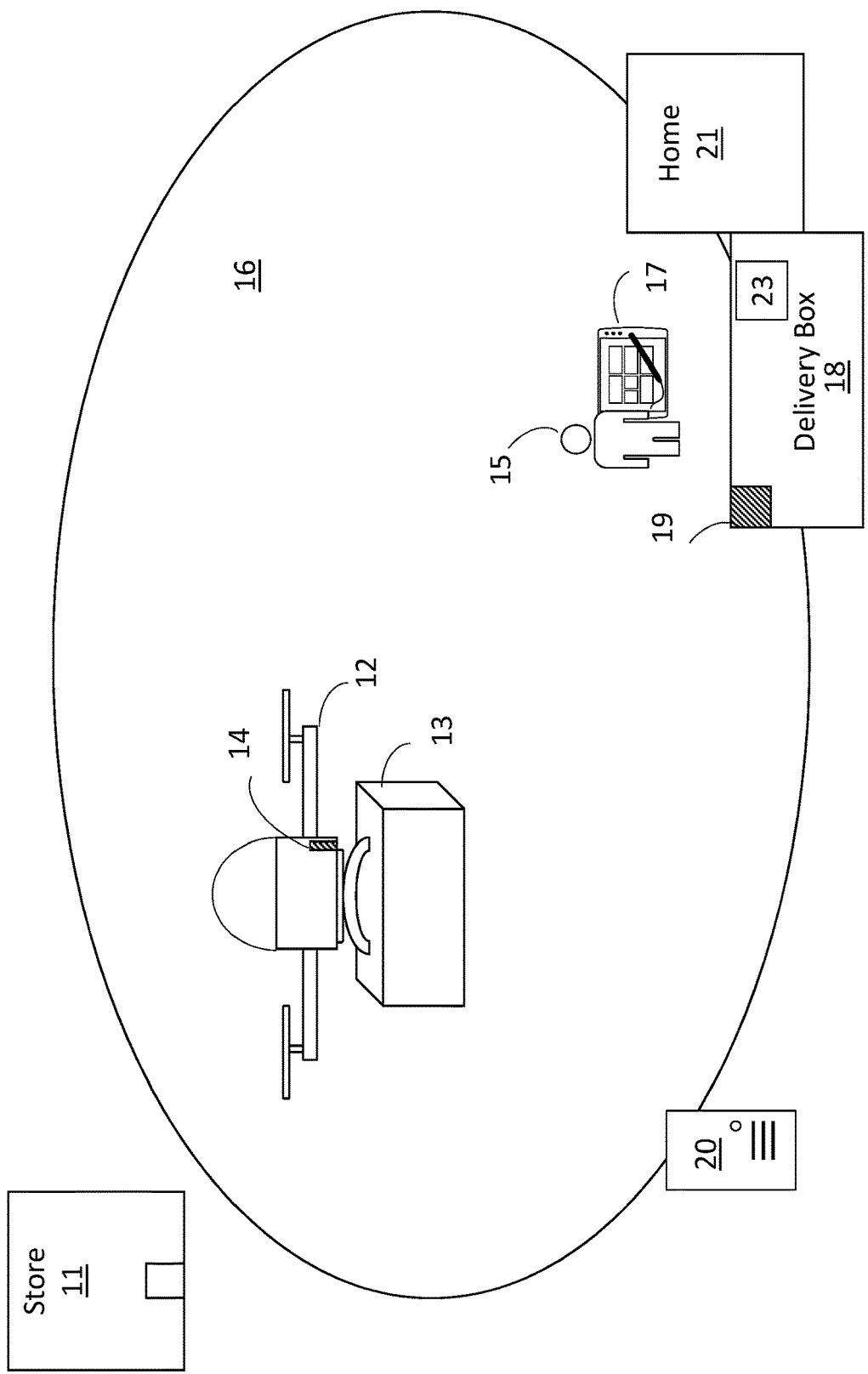
FIG. 1 is an illustration of an environment in which embodiments of the present inventive concepts can be practiced.

FIG. 1 is an illustration of an environment in which embodiments of the present inventive concepts can be practiced. The environment includes one or more unmanned aerial vehicles (UAVs) 12, a geofence system, a delivery box 18, and a delivery management system 20. Some or all of the UAV 12, geofence system, delivery box 18, and delivery management system 20 can communicate with each other and/or other computer devices via a wired and/or wireless communications network (not shown). These elements of the environment permit a payload 13, for example, a package comprising at least one item, to be transported by a UAV 12 to a location designated for receiving delivery of the payload 13. The location for receiving the package may include a delivery box 18 at a home 21, business, or other location.

The UAV 12 may be remotely piloted, for example, from a ground station or control station (not shown). Although a UAV 12 is described, other unmanned or autonomous vehicles may equally apply, such as an autonomous ground vehicle (AGV). In addition to a motor, rotors, and other well-known components, the UAV 12 includes components for receiving and holding in place the payload 13, in particular, one or more packages including items for delivery to a consumer 15, for example, hooks, clamps, prongs, base platform, and so on. The UAV, AGV, or the like may also be able to aid the locker system of the delivery box in opening, closing, and/or otherwise controlling its payload mechanism.

The payload goods 13 for delivery may be provided by a store 11, or a warehouse, commercial center, private residence or business, or other source to the UAV 12. Although a store 11 is shown, one or more elements of a retail supply chain may participate in the transportation of the payload items 13 to the UAV 12, for example, trucks, boats, trains, airplanes, and so on. Although retail sales are described, embodiments may apply to personal transactions, for example, the delivery of an item to a buyer of an item that was sold on a classified advertisement website, online auction, and so on.

In some embodiments, the delivery box 18, also referred to an autolocker, includes a control mechanism 23 for opening and closing a door (see FIG. 2), lid, and may control robotics or other mechanical devices that open, close, lock, and/or unlock the delivery box 18, which operate in response to a control signal received by the control mechanism. In some embodiments, sensors are provided that determine if the delivery box 18 is clear for closing its payload door, for example, to ensure that the door is not accidentally closed on a person or object.

A geofence region 16, or electronic perimeter or boundary, is for establishing a time and/or location of the UAV 12 relative to the delivery box 18 at which a trigger is generated for opening, closing, locking, or unlocking the delivery box 18. The presence of the geofence 16 permits the delivery box 18 to open (prior to customer arrival) to allow the UAV 12 to deliver the payload 13.

The geofence region 16 can be formed by telecommunications equipment, data processing systems, and global positioning systems, along a determination of the locational boundaries of the geofence region 16. In some embodiments, the geofence system includes a beacon and a beacon reader for forming the geofence 16. To achieve this, in some embodiments, a tag 14 or other electronic device that generates a beacon is affixed to the UAV 12 or its payload 13. The delivery box 18 includes a beacon reader 19 that tracks a location and/or movement of the tag 14, and therefore the payload 13 and UAV 12. Here, a beacon on the drone and a reader 19 on the delivery box 18 permits the delivery box 18 to receive the drone's beacon, whereby the door on the delivery box 18 may be unlocked and opened when the delivery boxy 18 receives the drone's beacon. Other tracking devices may be used such as ultra-wideband (UWB), Wi-Fi, LIDAR, Bluetooth, beaconing technologies, and so on.

The geo-fence 16 is formed at a location where the UAV's beacon signal is within range of the beacon reader 19 at the delivery box 18.

In other embodiments, the UAV 12 or its payload 13 includes a reader 19, and the delivery box 18 includes a tag 14 or the like that can be read by the reader 19. In some embodiments, three different beacons can be output from the delivery box 18, which can be used by the UAV 12 to triangulate the position of the opening of the delivery box 18 for more accurate delivery of the payload 13. In other embodiments, the geofence 16 is formed from combination of a tag 14 or beacon on both the drone 12 and delivery box 18 and a reader 19 on the drone 12 and the delivery box 18, which provides additional security. The advantage of the beacon 14 on the drone 12 is that the drone 12 would have an address of which the customer could authorize for the package delivery. The advantage of the beacon on the delivery box 18 is that the drone 12 can authorize the delivery of the payload 13. In a dual validation situation both would have beacons and both would validate that this is the correct delivery box 18 and the correct drone for the delivery.

In other embodiments, the UAV 12 and delivery box 18 may communicate with each other via Bluetooth™ or other signaling method. Here, a Bluetooth™ communication may permit the delivery box 18 to send its identifier to the UAV 12, and for the UAV 12 to provide its identifier for confirmation of the identity of the UAV 12 for security reasons.

In some embodiments, the UAV 12 may include a camera or related sensor for detecting images, e.g., taking pictures of the delivery box 18 that may be output electronically to ensure that the payload is visually clear of obstructions. For example, the UAV 12 may aid in assisting the locker system at or in communication with the delivery box 18 in determining a clear payload from obstructions. For example, the UAV 12 may hover in an aerial position above the delivery box 18 checking for obstruction and communicating information with the delivery box 18.

In some embodiments, the delivery box 18 may also include a delivery encryption system comprising a blockchain for package tracking and authentication. Package tracking by blockchain may include elements including but not limited to location, supply chain transition, authentication of the courier and customer, ambient temperature of the container, temperature of the product if available, acceptable thresholds for ambient temperature of the product, package contents placed in the container system (products & goods), or a combination thereof.

The blockchain may include an ongoing chain hashed with key addresses along the chain of custody, including hashing with a seller private key address, a courier private key address and a buyer private key address, but not limited thereto. The product's key may be included with a chain of custody, which may provide age-specific access for the product or person-specific access for the product and/or temperature requirements for the product and ambient environment required, or special handlings.

A blockchain processing device, for example, located at the delivery device 18, the delivery management system 20, or part of another computer server or processor, or a combination thereof, may register items to be delivered and placed within the inner volume of the delivery box 18; and may track, register, and authenticate items moving through a supply chain, for example, delivered to the delivery box 18 moving through a supply chain. Initiation of this system may begin at two different points that converge, namely, a scheduled and accepted delivery and a product key and related information. Both the delivery and the product establish a blockchain, which converge when the product and delivery have been established.

In some embodiments, the blockchain associated with the contents placed in the delivery box 18 dynamically adjusts to account for the cold chain status of an item for delivery to the delivery box 18. A process may begin with a product of the contents having a blockchain identifier. When the product's identifier is scanned at or by the delivery box 18, the delivery box 18 may receive and process product specific information. The delivery boxy 1, or more specifically a computer processor, may then retrieve specific handling information (temperature, etc.) from either the product's blockchain or from a central server, which will provide a block of information related to the product's specific handling.

Then, as the product is in transit to the delivery location, the box 18 may monitor via sensors and/or other detection devices information on the product's status (temperature, etc.). The delivery box 18 and/or computer in communication with the delivery box 18 may supplement the delivery blockchain with information on the product's status, and further adjust its internal conditions (temperature, etc.) based on the findings of the product's status as well as the appropriate conditions that must be met. This information may continuously update the block of information, creating additional blocks subsequent to the original, which will be distributed to the peer-to-peer ledger system; which in turn may be accessed by couriers, customers, retailers, etc.

The chain block of a delivery encryption system may track and authenticate each of the contents of the delivery box 18. For example, as individuals such as consumers and/or entities interact with a parcel or product, they may do so using a private or public key. When this occurs, new blocks will be added to the subsequent root blocks, which will contain information relating to the date and time a product or parcel was accessed, as well as the key that accessed the product or parcel. The foregoing may be distributed to the peer-to-peer ledger system or other communication system, which may be available to customers, retailers, couriers, etc. Tracking information may include access, authentication, temperature, location, time, etc.

Authentication and access may be restricted to specific blockchain keys to access the contents of a parcel's payload, and may include specific times and locations. Access to the contents may be determined at the scheduling and purchase of a delivery or products. Alternatively, access may be determined while a product moves through the supply chain, such as courier acceptance, package transition from courier to home, package drop off at the home, etc.; all of which will require the original authenticated person, possibly the purchaser, to access the original blockchain on the peer-peer system, where then the purchaser may make changes to the access and authentication, allowing for dynamic and remote access to the contents. Temporary keys may also be used to grant temporary access. The delivery management system 20 may distribute information to a customer's mobile electronic device such as a smartphone or personal computer, the information including but not limited to data regarding the package in route, package accepted by delivery box, status of package in route, remote access, and so on, some or all of which may be communicated, distributed, and demonstrated through blockchain.

In other embodiments, the geofence 16 is formed by a device that determines and uses the GPS location of the delivery box 18, which can be provided by the device to the delivery management system 20. The known GPS location of the UAV 12 is also sent to the delivery management system 20 by the UAV 12 sending its location information to the delivery management system 20 as it flies toward the delivery box 18. When the UAV 12 is within a predetermined distance from the delivery box 18, the delivery management system 20 activates the control mechanism 23, for example, including robotic elements on the delivery box 18, via the internet connection or other communication technique. When the UAV 12 is determined to be outside the range of the delivery box 18 GPS range, the door 27 on the delivery box 18 closes. Opening and closing the delivery box 18 in this manner is performed by the delivery management system 20 controlling the robotics or other mechanical elements.

In some embodiments, a combination of the foregoing may be used to form the geofence 16.

In some embodiments, the reader 19 tracks the geo-fence beacon generated and output from the UAV 12, determines when the UAV 12 is within range of the beacon emitted by the tag 14, whereby the reader 19 and the tag 14 can exchange signals for opening (prior to arrival of the UAV 12) and closing the delivery box 18. The geofence region 16 formed by the reader 19 and tag 14 therefore establishes when the delivery box 18 is opened and closed.

In some embodiments, both the UAV 12 and delivery box 18 are internet-enabled so that when the beacon reader 19 (on either the UAV 12 or delivery box 18) receives a beacon signal (from the other of the UAV 12 or delivery box 18), a notification of the communication established between the UAV 12 and delivery box 18 is transmitted to the delivery management system 20 to establish the identity of the UAV 12 and confirm whether the correct UAV 12 is approaching the delivery box 18. In particular, the reader 19 on the delivery box 18 determines which UAV beacon is being received, and the system 20 validates that the UAV 12 is the correct UAV for delivering the payload 13. When the UAV 12 is within a distance from the delivery box 18 permitting communication to be established between the UAV 12 and the delivery box 18, and the delivery management system 20 validates the identity of the UAV 12 for example using blockchain, a signal is sent to the delivery box 18, e.g., robotics or other control device, to open and optionally unlock the delivery box 18 for the UAV 12 to deliver the payload 13. After the payload 13 is delivered and the UAV 12 leaves the area, i.e., flies outside the geofence 16, the beacon reader 19 can no longer communicate with the tag 14 or the like. Here, the delivery management system 20 sends a signal to the delivery box 18, e.g., robotics or other control device, to close and optionally lock the delivery box 18. Communications between the delivery management system 20 and the UAV 12 and the delivery box 18 can be made via the internet or other communications network. The UAV 12 can communicate autonomously via a cellular service, ground station, local WiFi connection, or other wireless communications network. The delivery management system 20 also creates order, route, and supplies lock box location. This may be achieved by the delivery box 18 sending a notification to the delivery management system 20, for example, via WiFi, cellular network, Bluetooth™ signal, or other electronic communication. Once the delivery management system 20 processes this information it then sends the corresponding customer who is associated with specified delivery box 18 of impending arrival of the payload 13.

In some embodiments, the delivery box 18 includes or is in communication with a locker system to assist the UAV in navigation to its payload; such as position, location, etc. This may be accomplished through beaconing, visual approach data distributed to the UAV, and so on.

Figure 2:
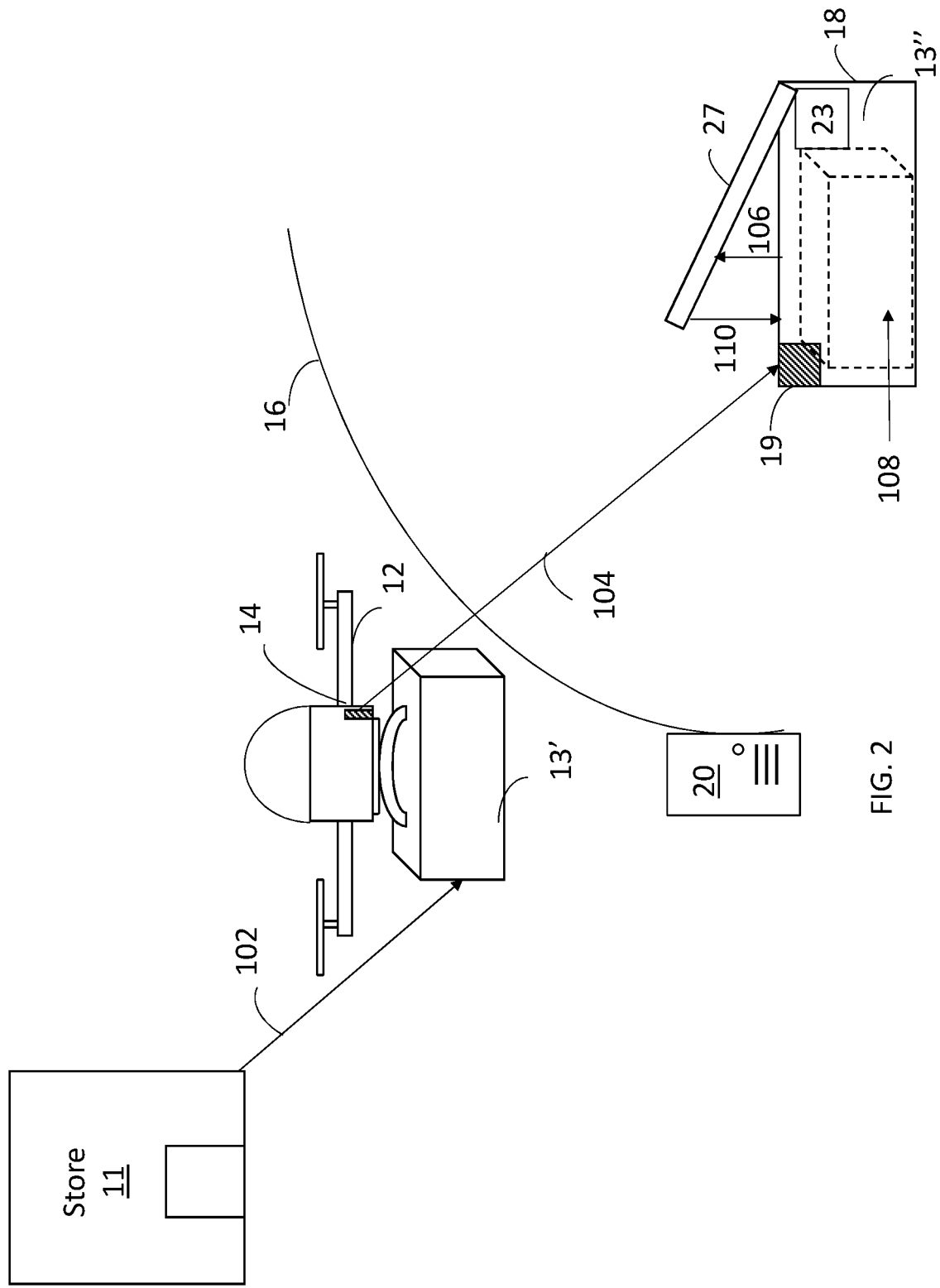
FIG. 2 is a diagram illustrating data exchanges between various elements of the environment of FIG. 1, in accordance with some embodiments.

FIG. 2 is a diagram illustrating data exchanges between various elements of the environment of FIG. 1, in accordance with some embodiments.

A store 11 provides (102) at least one item to a UAV 12 for delivery as a payload 13' to a customer 15 at a predetermined location, e.g., a home 19, a business, and so on. The UAV 13 may receive the item from the store 11 by any known delivery method.

The UAV 12 is tracked (104). In some embodiments, the UAV 12 is tracked by GPS communications. The GPS information is transmitted by the UAV to the delivery management system 20 through a cellular service or the like on the UAV 12 or through the ground station it communicates with through radio. The GPS location data can then be transmitted to the customer 15 to track the location of the UAV 12 on a map displayed upon a display of the user's smart device 17. The GPS device on the UAV 12 may complement the tag 14 on the UAV 12 with respect to establishing a location of the UAV 12 relative to the geofence 16 and/or deposit box 18, since beacons emitted from the tag 14 may provide an added "just-in-time" validation for security of opening and closing the door on the delivery box 18. This is particularly beneficial where both a beacon and a reader are located on the delivery box 18 and UAV 12 for providing dual validation. Users of the system 20 can track the process from beginning to end from the GPS data. For example, the customer 15 may view a video feed from an on-board camera (not shown) on the UAV 12.

Data can be collected such as distance between the UAV 12 and the delivery box 18 and/or related data. This data is used to give real time updates to customers of the standing of estimated time until delivery of the payload 13.

In some embodiments, either a tag 14 or other beacon generator is on the UAV 12 and the delivery box 18, and a reader is on the other of the UAV 12 and the delivery box. In embodiments where both the UAV 12 and delivery 18 has a beacon transmitter, e.g., tag 14, and a beacon reader 19, the delivery box beacon reader 19 receives a beacon signal from the UAV 12, and the UAV's beacon reader 19 receives a beacon signal from the delivery box 18. Here, both the delivery box 18 and UAV 12 transmit signals from each other to the delivery management system 20 for verification. Once verification is determined, a signal is sent to the delivery box 18 to open and/or unlock the delivery box 18. Also, a notification signal is sent to the UAV 12 so that the UAV 12 will complete the trip and deliver (108) the payload 13 to the delivery box 18. The delivery management system 20 is involved when the UAV 12 approaches the delivery box 18 within the geofence 16 to process and provide updates to the customer 15 of the impending arrival of the UAV 12 and delivery (108) of the payload 13.

After delivery (108), a determination is made (110), for example, by the UAV communication device 36, that the UAV 12 has moved outside the geofence 16, whereby the door on the delivery box 18 can be automatically closed. The determination may be made when the delivery box 18 and UAV 12 can no longer communicate, for example, one cannot receive a beacon from the other.

Figure 3:
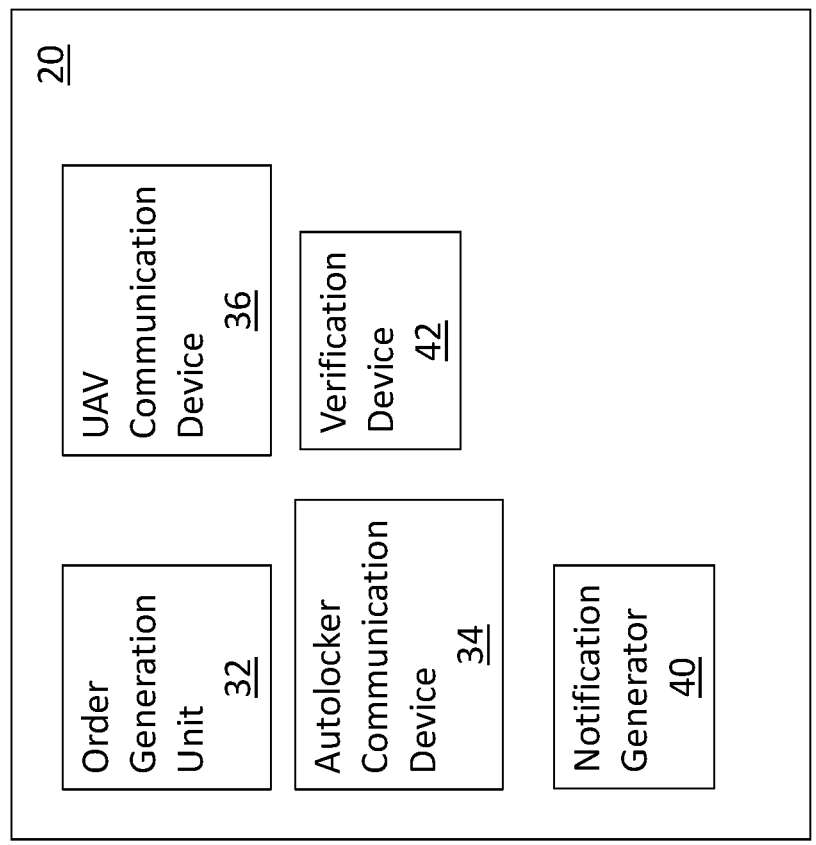
FIG. 3 is a block diagram of a delivery management system, in accordance with some embodiments.

FIG. 3 is a block diagram of a delivery management system 20, in accordance with some embodiments. In describing the delivery management system 20, reference may be made to FIGS. 1 and 2.

The delivery management system 20 may include an order generation unit 32, an autolocker communication device 34, a UAV communication device 36, a notification generator 40, and a verification device 42. Some or all of these elements of the delivery management system 20 may be present under a same computer hardware platform. In other embodiments, these elements may be located on two or more different computer hardware platform, and can communicate with each other and/or other elements of the delivery management system 20 via a communication network such as a network forming geofence region 16, for example, a wired or wireless network that exchanges data electronically.

The order generation unit 32 may generate a delivery order, which may include delivery details regarding a purchase item, such as a flight path from the origin of the purchased item, e.g., a warehouse or retail store shelf, to a destination address, e.g., the location of a delivery box 18 at a home 21 identified in the delivery order. The order generation unit 32 may receive item purchase data from a point of sale (POS) system at a store checkout, from an online checkout system, or the like. Flight plan data may be generated from delivery data, for example, from the purchase location and destination identified by the customer 15. Other information may include but not be limited to router, locker location, order updates, and so on. The order generation unit may compare a destination identified by the customer 15 with a list of known delivery boxes 18 which can be used to establish a flight path, or alternative paths, of the UAV 12 carrying the purchased item 13 to its destination.

As described herein, an order generation unit 32 may determine a flight path or alternative paths. Blockchain technology may be used to create new orders in the order generation unit 32. When an order has been created for a customer to receive a delivery by way of the UAV 12 to their delivery box 18, a new blockchain will be created with this order; information will contain: location of delivery, delivery number, time of delivery, product's needs (temperature, fragile, etc.), authentication (keys, etc.), pickup information, etc. Here, since blockchain is used to create the order, all other occurrences thereafter will supplement the blockchain with additional blocks of information.

The autolocker communication device 34 communicates with a processor at the delivery box 18 that controls the mechanism (not shown) that opens and closes the door 27 on the delivery box 18. The delivery box 18 may include a communication device that receives signals from the autolocker communication device 34 including instructions for opening and closing the door 27 and/or locking and unlocking the delivery box 18.

The autolocker communication device 34 may communicate with the tag 14 and/or reader 19 at the delivery box 18 for monitoring and/or processing location information regarding the UAV 12 to establish when to open, close, lock, or unlock the delivery box 18.

The UAV communication device 36 may communicate with a tag 14 and/or reader 19 at the UAV 12 for monitoring and/or processing location information regarding the UAV 12 to determine whether the UAV 12 is proximal a geofence region 16, and to provide this data to the autolocker communication device 34 for determine when to open, close, lock, and/or unlock the delivery box 18.

The UAV communication device 36 may receive from the UAV 12 GPS information that can be used to track the UAV 12 during delivery of the payload 13.

Thus, either the autolocker communication device 34 or UAV communication device 36 may be constructed and arranged to receive a notification of a communication established between the UAV 12 delivering a payload 13 and the delivery box 18 constructed and arranged to receive the payload from the UAV, which establishes that the UAV 12 is at the geofence 16. In particular, the autolocker communication device 34 may receive a notification of a communication established between the UAV 12 and the delivery box 18 from a beacon reader 19 when the delivery box 18 has the beacon reader 19. The UAV communication device 34 may receive a notification of a communication established between the UAV 12 and the delivery box 18 from a beacon reader 19 when the UAV 12 has the beacon reader 19.

The instruction generator 38 generates an instruction for opening, closing, locking, unlocking, or other command for controlling the operation of the delivery box 18 in response to an authorization of the UAV 12 to deliver the payload 13 to the delivery box 18 and further in response to a determination by devices such as sensors, optical devices, or the like, that the UAV 12 is a predetermined distance from the delivery box 18, i.e., at the geofence 16 formed when a communication is established between the UAV 12 and the delivery box 18. The instruction generator 38 may also receive an instruction, for example, to lock and/or close the door on the delivery box 18, in the absence of a signal from the UAV 12, for example, indicating that the UAV 12 is out of range of the box 18, which can automatically trigger the closing and/or locking of the box 18.

The notification generator 40 can send the customer 15, or more specifically, the customer's electronic device 17, information on order updates, lockbox information, package deposit notification, purchase information, and so on.

The verification device 42 validates the identity of a UAV 12 carrying a payload 13 and communicates with the robotics or other control device at the delivery box 18 to open and optionally unlock the delivery box 18 for the UAV 12 to deliver the payload 13. To verify a UAV identity, the verification device 42 may process a notification received by the autolocker communication device 34 or the UAV communication device 36 of a communication established between the UAV 12 and delivery box 18, depending on whether the autolocker communication device 34 or the UAV communication device 36 has a beacon reader 19 or other receiver of a signal establishing that the UAV 12 is at the geofence 16. The communication may include identity data related to the UAV 12 to distinguish the UAV 12 from other UAVs.

As described herein, the geofence 16 is a logical fence which is built from the location reception area of a reader 19 in proximity to a beacon. When the reader 19 picks up a beacon, the verification device 42 undergoes an authorization process to confirm access to the delivery box 18. In some embodiments, blockchain keys may be used, such as the customer's private key hashed with a public key, allowing the customer to access the delivery box. In another example, the UAV's private key is hashed with its public key, allowing the UAV 12 access to the delivery box 18.

Customers 15 who retrieve a package of a received payload 13 from the delivery box 18 may use a Bluetooth™ connection or the like to the delivery box 18 with their smart device 17 to unlock the delivery box 18 and gain access to the delivery box contents. This authorization could be automated similar to keyless cars which start with a drivers proximity to the car. Other methods such as a key pad on the lock box may be used by the customer 15 to access the delivery box 18 directly. The import aspect is that the customer 15 must be within a close proximity of the delivery box 18 for it to open to prevent an accidental opening of the box 18.

Figure 4:
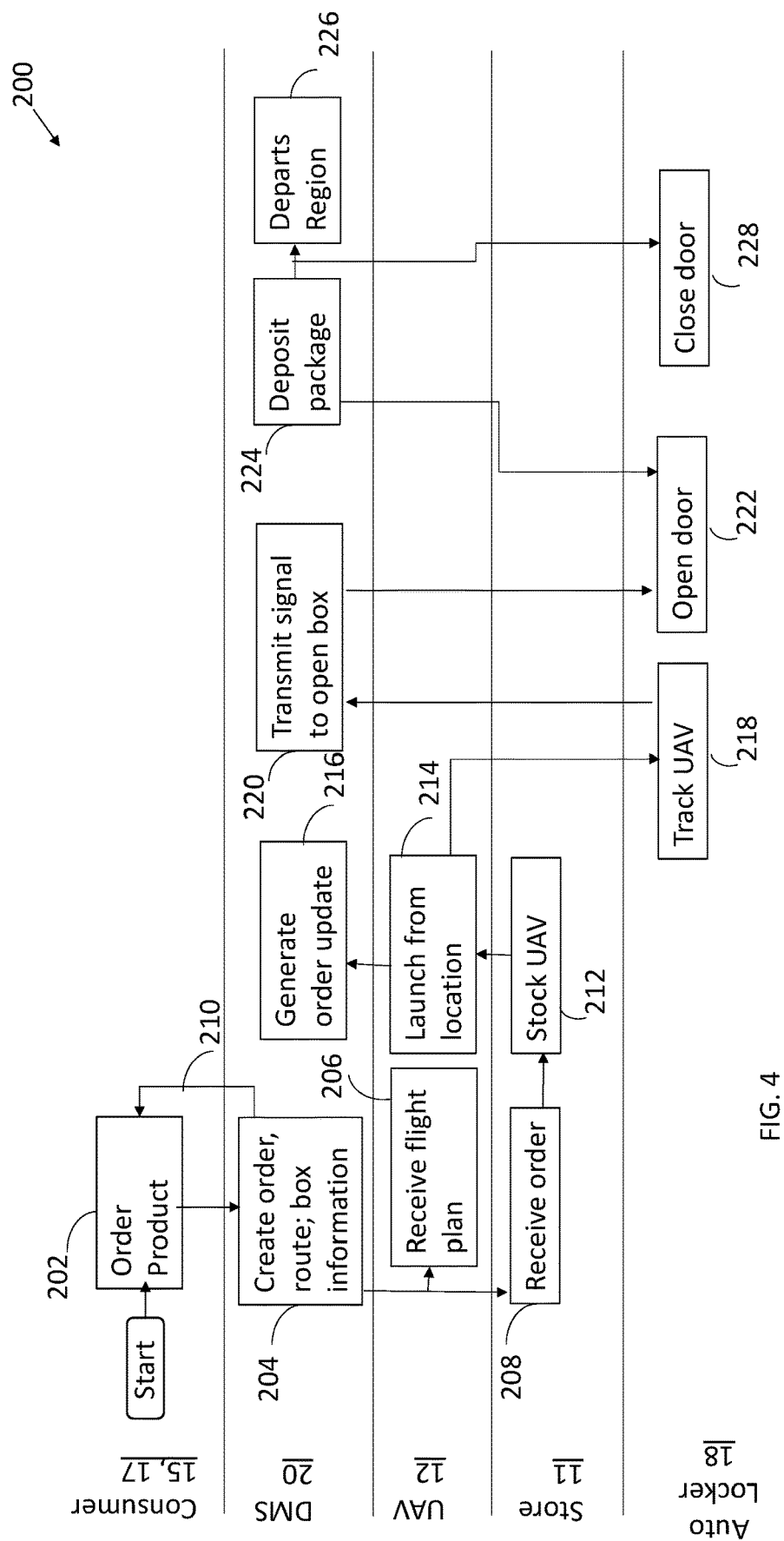
FIG. 4 is a process flow for a last mile delivery service, in accordance with some embodiments.

FIG. 4 is a process flow 200 for a last mile delivery service, in accordance with some embodiments. Some or all of the steps in the process flow 200 can be governed by instructions that are stored in a memory and processed by a hardware processor of an electronic device such as a computer with respect to a consumer 15, delivery management system 20, UAV 17, store 11, and/or autolocker 18 described with respect to FIGS. 1-3.

At step 202, a consumer 15 may order a product that can be delivered as a payload 13 by a UAV 12. For example, the consumer 15 may purchase an item at a store 11 and request that the item be delivered to the consumer's home 21 or other designed location.

At step 204, the order is generated, for example, at a store checkout counter or online website e-commerce application. In generating the order, the delivery management system 20 may determine delivery details, such as a flight path from the origin of the purchased item, e.g., a warehouse or retail store shelf, to the destination address, e.g., the location of a delivery box 18 at the home 21 identified in delivery instructions received by the delivery management system 20. In doing so, the delivery management system 20 may store a list of delivery boxes and corresponding location information.

At step 206, flight plan data may be provided by the delivery management system 20 to the UAV 12. The UAV 12 may include a processor that processes the flight plan data, for example, automatically complies with instructions in the directional information provided flight plan data.

At step 208, the store 11 receives the order from the delivery management system 20, and at step 212 with the goods according to the order.

At step 210, locker information is sent to the customer. This information may include a locker number and a locker passcode, QR code, or the like to allow only that customer to identify and open which delivery box is for holding the customer's product.

At step 214, the UAV 12 is launched for delivering the goods according to the order.

At step 216, an order update may be generated, and sent to the customer 15, more specifically, the customer's computer 17, which may communicate with the delivery management system 20, UAV 12, and/or delivery box 18. In some embodiments, the customer 15 is notified with each major action taken, e.g., order received, order filled, drone launched, and/or package landed ready for pickup. The customer 15 may follow or track the UAV 12 from the UAV's GPS location data, which is transmitted and processed during the UAV's trip to the delivery box 18.

At step 218, the UAV 12 is tracked. The UAV 12 may be tracked with an on-board GPS signal. In some embodiments, the UAV 12 has a GPS system which establishes its position, similar to an automobile GPS system. The UAV 12 can communicate its GPS position through the ground station or directly through satellite or cellular service.

At step 220, the delivery management system 20 transmits a signal to open the delivery box 18 in response to verification of authorization and identity of the UAV 12 and a determination that the UAV 12 is inside the geofence 16. At step 222, the door 27 to the delivery box 18 is opened, for example, by mechanical devices that receive signals from a control device receiving the open box signal from the delivery management system 20.

At step 224, the UAV 12 delivers the payload 13 to the delivery box 18. At step 226, the UAV 12 departs from the deposit box 18.

Once the UAV 12 is outside the geofence 16, the delivery box 18 is locked and the user is notified to pick up the package. The way the system 20 knows the UAV 12 is outside the geofence 16 is by the delivery box 18 no longer picking up the UAV's beacon on the box's beacon receiver because the UAV 12 has flown away. The delivery box 18 notifies the user through the delivery box's connection with the internet and the system. The system 20 then transmits the notification to the user via text, email, phone call, or by other means specified by the customer. Once the customer collects their package, the lockbox communicates this empty state back to the system to which the system 20 now can make this delivery box 18 available to another user or another package to the same user.

The lockbox may also have a scale of video camera to confirm the empty contents and does not just assume the package is gone. Laser distance measures could also be used within the lockbox to ensure there are no objects obstructing the laser. The video could be checked to see if the lockbox is clean and ready for reuse.

As will be appreciated by one skilled in the art, concepts may be embodied as a device, system, method, or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Computer program code for carrying out operations for the concepts may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Concepts are described herein with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While concepts have been shown and described with reference to specific preferred embodiments, it should be understood by those skilled in the art that various changes in form and detail may be made therein without departing from the spirit and scope as defined by the following claims.

What is claimed is:

1. A delivery management system, comprising:
   a communication device that receives a notification of a communication established between an unmanned aerial vehicle (UAV) that delivers a payload and a delivery box constructed and arranged to receive the payload from the UAV when the UAV is within a predetermined distance from the delivery box and moving in a direction toward the delivery box, the communication including an identity of the UAV;
   dual-validation system that executes an authorization process to confirm access to the delivery box that includes validating both an identity of the delivery box and the identity of the UAV, comprising:
      a first beacon-generating electronic device of the UAV;
      a first beacon reader of the delivery box that exchanges user-authorization data with the first beacon-generating electronic device;
      a second beacon-generating electronic device at the delivery box; and
      a second beacon reader of the UAV that exchanges drone-authorization data with the second beacon-generating electronic device;
   a special-purpose computer that generates an instruction to the delivery box to open the delivery box in response to the dual-validation system validating the identity of the UAV and a determination by the communication device that the communication is established between the UAV and the delivery box, wherein the communication device includes an autolocker communication device that outputs the instruction to the delivery box;
   a blockchain processing device that, in response to determining that the UAV is within the predetermined distance from the delivery box, validates as part of the authorization process the identity of the UAV using blockchain to allows access to the delivery box, and authenticates the payload delivered by the UAV to the delivery box, wherein the special-purpose computer generates the instruction and the autolocker communication device outputs the instruction to the delivery box in response to the authorization process; and
   an order generation unit that generates a delivery order for the payload and compares an identified destination for the payload to a list of delivery boxes to determine a flight path for the UAV to the delivery box selected among the list of delivery boxes at or proximal to the identified destination, wherein the blockchain is created for the delivery order in the order generation unit to provide authentication data for user access to the selected delivery box and authentication data of the payload.

2. The delivery management system of claim 1, wherein the special purpose computer includes an instruction generator that generates an instruction to the delivery box to unlock the delivery box.

3. The delivery management system of claim 2, wherein the instruction generator generates the instruction to open the delivery box or unlock the delivery box to a robotics mechanism at the delivery box that physically opens or locks the delivery box.

4. The delivery management system of claim 1, wherein the communication device determines when the UAV is moving in a direction away from the delivery box and is a predetermined distance from the delivery box after delivery of the payload, and wherein the autolocker communication device outputs an instruction to the delivery box to close the delivery box.

5. The delivery management system of claim 4, wherein the determination is made when the UAV flies outside a geofence about the delivery box, and the UAV cannot communicate with the delivery box.

6. The delivery management system of claim 1, wherein the first or second beacon-generating electronic device comprises a tag for transmitting a beacon signal.

7. The delivery management system of claim 1, further comprising a notification generator that generates and outputs information regarding the delivery order to an electronic device.

8. The delivery management system of claim 1, wherein the blockchain processing device tracks, registers, and authenticates items of the payload moving through a supply chain.

9. The delivery management system of claim 1, wherein validation of the UAV is accomplished through a distribution and sharing of public and/or private keys from a locker system of the delivery box and the UAV, and wherein authentication of the payload delivered by the UAV to the delivery box is performed by comparing acceptable keys from a peer to peer ledger system with keys used by the UAV and locker system.

10. The delivery management system of claim 1, wherein the geofence system is one or more of telecommunications equipment, a beacon device, and a global positioning system.

11. A store item delivery system, comprising:
   an unmanned aerial vehicle (UAV) that delivers a payload to a destination;
   a delivery box constructed and arranged to receive the payload;
   a geofence system that determines when the UAV is a predetermined distance from the delivery box;
   a delivery management system that controls access to the delivery box in response to a determination of the UAV relative to the geofence system; and
   a dual-validation system that executes an authorization process to confirm access to the delivery box that includes validating both an identity of the delivery box and an identity of the UAV, comprising:
      a first beacon-generating electronic device of the UAV;
      a first beacon reader of the delivery box that exchanges user-authorization data with the first beacon-generating electronic device;
      a second beacon-generating electronic device at the delivery box; and
      a second beacon reader of the UAV that exchanges drone-authorization data with the second beacon-generating electronic device, the store item delivery item further comprising:
   a blockchain processing device that, in response to determining that the UAV is within the predetermined distance from the delivery box, communicates with the delivery management system to validate as part of the authorization process the identity of the UAV using a blockchain to, to allow access to the delivery box, and to authenticate the payload delivered by the UAV to the delivery box; and
   an order generation unit that generates a delivery order for the payload and compares an identified destination for the payload to a list of delivery boxes to determine a flight path for the UAV to the delivery box selected among the list of delivery boxes at or proximal to the identified destination, wherein a blockchain is created for the delivery order in the order generation unit and to provide authentication data for user access to the selected delivery box and authentication data of the payload.

12. The store item delivery system of claim 11, wherein the delivery management system generates an instruction to the delivery box to unlock the delivery box.

13. The store item delivery system of claim 12, wherein the delivery management system generates the instruction to open the delivery box or unlock the delivery box to a robotics mechanism at the delivery box that physically opens or locks the delivery box.

14. The store item delivery system of claim 11, wherein the delivery management system determines when the UAV is moving in a direction away from the delivery box and is a predetermined distance from the delivery box after delivery of the payload, and outputs an instruction to the delivery box to close the delivery box.

15. The store item delivery system of claim 11, wherein the UAV is tracked by GPS communications that is transmitted from the UAV to the delivery management system.

16. The store item delivery system of claim 15, wherein location data of the GPS communications is transmitted to an electronic device, which displays the location data.

17. The store item delivery system of claim 15, wherein at least one of the first or second beacon-generating electronic device comprises a tag for transmitting a beacon signal, and wherein the GPS communications complement the beacon signal for determining a location of the UAV and validating for security of opening and closing of the delivery box.

18. The store item delivery system of claim 11, further comprising:
   sensors to determine when a product has been received by a locker system of the delivery box; and
   sensors to determine when the payload is clear of obstructions so the locker system can close the delivery box.

19. A method for delivery, comprising:
   establishing a communication between an unmanned aerial vehicle (UAV) that delivers a payload and a delivery box constructed and arranged to receive the payload from the UAV when the UAV is a predetermined distance from the delivery box and moving in a direction toward the delivery box;
   executing an authorization process to confirm access to the delivery box that includes validating both an identity of the delivery box and an identity of the UAV, wherein the validating comprises:
      exchanging user-authorization data between a first beacon reader of the delivery box and a first beacon-generating electronic device of the UAV;
      exchanging drone-authorization data with a second beacon-generating electronic device of the delivery box with a second beacon reader of the UAV; and
   in response to determining that the UAV is within the predetermined distance from the delivery box, validating, by a blockchain processing device as part of the authorization process the identity of the UAV using blockchain to allow access to the delivery box, and authenticate the payload delivered by the UAV to the delivery box; and
   generating, by a special purpose computer, an instruction to open the delivery box and outputting, by an auto-locker communication device, the instruction to the delivery box in response to a determination that the communication is established between the UAV and the delivery box, and the authorization process; and
   generating, by an order generation unit, a delivery order for the payload and comparing an identified destination for the payload to a list of delivery boxes to determine a flight path for the UAV to the delivery box selected among the list of delivery boxes at or proximal to the identified destination; wherein the blockchain is created in the order generation unit for the delivery order to provide authentication data for user access to the selected delivery box and authentication data of the payload.

* * * * *